US 9,325,435 B2

(12) United States Patent
Olgaard et al.

(10) Patent No.: US 9,325,435 B2
(45) Date of Patent: Apr. 26, 2016

(54) SYSTEM AND METHOD FOR FACILITATING COMPARISON OF RADIO FREQUENCY (RF) DATA SIGNALS TRANSMITTED BY A DEVICE UNDER TEST (DUT) AND RECEIVED BY A TEST SYSTEM

(75) Inventors: Christian Volf Olgaard, Saratoga, CA (US); Jonathan Barry Hirst, Sunnyvale, CA (US); Wing Hung Lee, Saratoga, CA (US)

(73) Assignee: LITEPOINT CORPORATION, Sunnyvale, CA (US)

( * ) Notice: Subject to any disclaimer, the term of this patent is extended or adjusted under 35 U.S.C. 154(b) by 190 days.

(21) Appl. No.: 13/554,035

(22) Filed: Jul. 20, 2012

(65) Prior Publication Data

US 2014/0024315 A1    Jan. 23, 2014

(51) Int. Cl.
*H04B 17/00* (2015.01)
*H04B 17/309* (2015.01)

(52) U.S. Cl.
CPC .............. *H04B 17/00* (2013.01); *H04B 17/309* (2015.01)

(58) Field of Classification Search
None
See application file for complete search history.

(56) References Cited

U.S. PATENT DOCUMENTS

| 4,607,215 | A  | * | 8/1986  | Takano et al. ............... 324/76.23 |
| 6,243,576 | B1 | * | 6/2001  | Seike et al. ................... 455/423 |
| 6,717,428 | B1 |   | 4/2004  | Spica |
| 7,275,197 | B2 | * | 9/2007  | Inaba et al. .................. 714/740 |
| 7,400,129 | B1 |   | 7/2008  | Prather |
| 2003/0025623 | A1 | * | 2/2003 | Brueske et al. ............... 341/139 |
| 2009/0105970 | A1 |   | 4/2009 | Kodera et al. |
| 2011/0109321 | A1 |   | 5/2011 | Kawabata et al. |
| 2011/0181312 | A1 |   | 7/2011 | Ouslis |
| 2011/0309960 | A1 |   | 12/2011 | Shimizu et al. |
| 2012/0041701 | A1 |   | 2/2012 | Hillman, Jr. et al. |
| 2012/0243595 | A1 | * | 9/2012 | Anderson et al. ............. 375/228 |

FOREIGN PATENT DOCUMENTS

| CN | 101779483 A1 | 7/2010 |
| KR | 10-2012-0014638 A | 2/2012 |

OTHER PUBLICATIONS

International Search Report Dated Jul. 9, 2013 for International Application No. PCT/US2013/033447.
Written Opinion Dated Jul. 9, 2013 for International Application No. PCT/US2013/033447.
International Preliminary Report, issued Jan. 20, 2015, 5 pages.
Chinese First Office Action received in Chinese Patent Application No. 20130038622.7 on Jan. 20, 2016; 5 pgs.

* cited by examiner

*Primary Examiner* — Ping Hsieh
*Assistant Examiner* — James Yang
(74) *Attorney, Agent, or Firm* — Vedder Price, P.C.

(57) ABSTRACT

A system and method for facilitating comparison of radio frequency (RF) data signals transmitted by a device under test (DUT) and received by a test system. A RF data signal received from a DUT is analyzed to provide analysis data indicative of conformance of the DUT operation with one or more applicable signal standards. The RF data signal is also converted to related conversion data that can be stored with state machine data corresponding to states of the signal testing subsystem. This state machine data can then be processed as needed with the analysis data and conversion data for off-line tasks such as debugging new test programs and procedures.

20 Claims, 7 Drawing Sheets

US 9,325,435 B2

SYSTEM AND METHOD FOR FACILITATING COMPARISON OF RADIO FREQUENCY (RF) DATA SIGNALS TRANSMITTED BY A DEVICE UNDER TEST (DUT) AND RECEIVED BY A TEST SYSTEM

BACKGROUND

The present invention relates to testing wireless radio frequency (RF) data signal transmitters, and in particular, to facilitating comparison of RF data signals transmitted by a device under test (DUT) and received by a test system.

Many communication devices use wireless technologies both for connectivity and for communications purposes. Because wireless devices transmit and receive electromagnetic waves, and because two or more wireless devices have the potential of interfering with the operations of one another by virtue of their signal frequencies and power spectral densities, these devices and their wireless technologies subscribe to various wireless-technology standard specifications.

In the designing of such devices, engineers take extraordinary care to ensure that such devices will meet or exceed each included wireless technology's prescribed standard-based specifications. Furthermore, once these devices are being mass produced, they are tested to ensure that manufacturing defects will not cause improper operation, including their adherence to the included wireless technology standard-based specifications.

As part of such manufacturing testing, current wireless device test systems employ a subsystem for analyzing signals received from a device under test (DUT), e.g., a subsystem such as a vector signal analyzer (VSA) for analyzing signals received from the DUT, and a subsystem such as a vector signal generator (VSG) for generating signals to be received by the DUT. The analysis performed by a VSA and the signals generated by a VSG are usually programmable so as to allow each to be used for testing a variety of wireless technology standards with differing frequency ranges, bandwidths, and modulation characteristics.

Today's wireless devices typically include circuitry designed to operate in accordance with several wireless signal technologies, such as WiFi (e.g., 802.11x), Bluetooth, cellular radio access technologies (e.g., LTE), and the like. In addition, to keep test time and costs from increasing as more and more wireless signal technologies are incorporated in such devices, some of today's wireless signal test systems are designed to capture and analyze longer signal sequences that have physical characteristics prescribed by two or more wireless signal technology standards.

In testing longer sequences of multiple technology characteristics, the test programs that control the test system (e.g., by controlling the VSA, VSG and other subsystems) become longer and more complex, and as does the test program debugging process. Often program debugging requires attaching external instruments, such as multi-channel oscilloscopes, to the test system and associated other test instruments in order to examine various control signals and power-versus-time displays so as to understand and solve problems related to the new-program debugging process.

SUMMARY

In accordance with the presently claimed invention, a system and method are provided for facilitating comparison of radio frequency (RF) data signals transmitted by a device under test (DUT) and received by a test system. A RF data signal received from a DUT is analyzed to provide analysis data indicative of conformance of the DUT operation with one or more applicable signal standards. The RF data signal is also converted to related conversion data that can be stored with state machine data corresponding to states of the signal testing subsystem. This state machine data can then be processed as needed with the analysis data and conversion data for off-line tasks such as debugging new test programs and procedures.

In accordance with one embodiment of the presently claimed invention, a test system for facilitating comparison of radio frequency (RF) data signals transmitted by a device under test (DUT) and received by the test system includes:

signal routing circuitry for routing at least one RF transmit data signal to and at least one RF receive data signal from a DUT;

data signal source circuitry coupled to the signal routing circuitry and responsive to a portion of a plurality of control signals and a plurality of transmit data by providing the at least one RF transmit data signal and a portion of a plurality of system data;

data signal analysis circuitry coupled to the signal routing circuitry and responsive to another portion of the plurality of control signals by processing the at least one RF receive data signal and providing a plurality of signal analysis data and another portion of the plurality of system data;

signal conversion circuitry coupled to the signal routing circuitry and responsive to the at least one RF receive data signal by providing a related plurality of receive conversion data; and a state machine coupled to the data signal source circuitry and the data signal analysis circuitry, and responsive to the plurality of system data by providing a plurality of state machine data.

In accordance with another embodiment of the presently claimed invention, a method of facilitating comparison of radio frequency (RF) data signals transmitted by a device under test (DUT) and received by a test system includes:

routing at least one RF transmit data signal to and at least one RF receive data signal from a DUT;

receiving a portion of a plurality of control signals and a plurality of transmit data and in responsive thereto providing the at least one RF transmit data signal and a portion of a plurality of system data;

receiving another portion of the plurality of control signals and in responsive thereto processing the at least one RF receive data signal and providing a plurality of signal analysis data and another portion of the plurality of system data;

converting the at least one RF receive data signal to provide a related plurality of receive conversion data; and processing the plurality of system data with a state machine to provide a plurality of state machine data.

DETAILED DESCRIPTION

Figure 1:
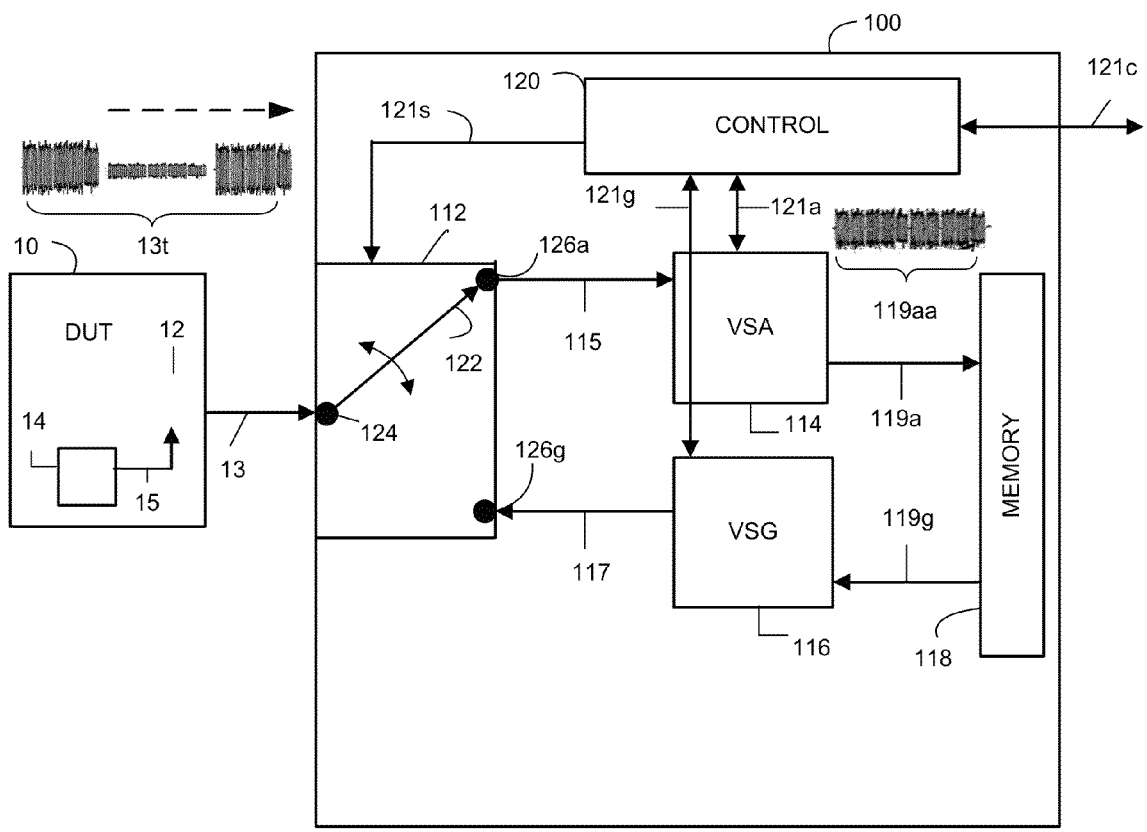
FIG. 1 is a block diagram of a conventional testing environment for testing a wireless signal device under test (DUT).

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry. Thus, for example, one or more of the functional blocks (e.g., processors, memories, etc.) may be implemented in a single piece of hardware (e.g., a general purpose signal processor, random access memory, hard disk drive, etc.). Similarly, any programs described may be standalone programs, may be incorporated as subroutines in an operating system, may be functions in an installed software package, etc.

As discussed in more detail below, a system and method are introduced for adding and using additional subsystems, internal to a testing system, which will support program debug for virtually any and all test programs, particularly those that involve long multi-technology signal sequences. As such, overall costs are reduced by eliminating need for costly external testing adjuncts and by potentially shortening program debug time by providing insights unavailable when using external testing adjuncts. Furthermore, it allows one to visualize what is actually happening between the DUT and test system in the sense that the DUT and test system are controlled independently so that the sequences, while appearing to be highly coordinated, are more loosely coupled. Having a view of what's happening within the DUT and tester offers a more complete debugging picture. Also, this can be achieved without imposing a test-time penalty. During normal operations, it is a matter of simply keeping a record, in parallel with ongoing execution of the test program. In the event of an error, the signal and control capture signal data can then be used to diagnose what has occurred.

Referring to FIG. 1, a conventional testing environment includes a test system 100, or tester, for testing a wireless signal DUT 10. The DUT 10 includes, among other subsystems, a RF transceiver 12 and a set 14 of pre-defined signal sequences to be initiated by one or more firmware routines, software commands or hardwired circuit structure(s) (various forms of each of which are well known in the art). The DUT 10 transmits a test signal sequence 13$t$ over a signal communication medium 14 (which is typically a hardwired signal path for purposes of testing, but may also be a wireless signal connection if desired) for reception by the tester 100.

The tester 100 includes, among other subsystems, signal routing circuitry 112 (discussed in more detail below), signal analysis circuitry 114 (e.g., a VSA), test signal generating circuitry 116 (e.g., a VSG), data storage circuitry 118 (e.g., memory circuitry locally within the tester 100 or remotely available via a network) and control circuitry 120 (e.g., microprocessor- or microcontroller-based). The control circuitry 120 exchanges control signals in data 121$a$, 121$g$ with the VSA 114 and VSG 116, and provides control signals 121$s$, as needed, for the signal routing circuitry 112. The control circuitry 120 can also exchange control signals and data 121$c$ with external circuitry, such as an external controller in the form of a personal computer (not shown).

The signal routing circuitry 112, in accordance with its control signals 121$s$ as required, performs two basic functions: routing the DUT transmit signal 13$t$ as the input signal 115 to the VSA 114, and routing the VSG output signal 117 to the DUT as a DUT receive signal. The routing circuitry 112 can be a switch, such as a single-pole 124, double-throw 126$a$, 126$g$ switch in which the signal path 122 switches between receive and transmit modes of the tester 100 (and transmit and receive modes of the DUT, respectively). Alternatively, the signal routing circuitry 112 can be implemented in other known ways (e.g., as a diplexer).

As depicted in FIG. 1, in accordance with the pre-defined signal sequence 14, the DUT transceiver 12 transmits a signal 13$t$ having, for example, three sub-sequences of which the middle sequence has a significantly reduced signal level or power. This signal 13$t$, routed as the input signal 115 to the VSA 114, results in a captured signal 119$aa$ which is sampled and provided by the VSA 114 as digitized signal data 119$a$ for storage in the memory 118. As depicted in FIG. 1, the captured signal 119$aa$ is lacking the middle sequence having significantly reduced signal power.

Figure 2:
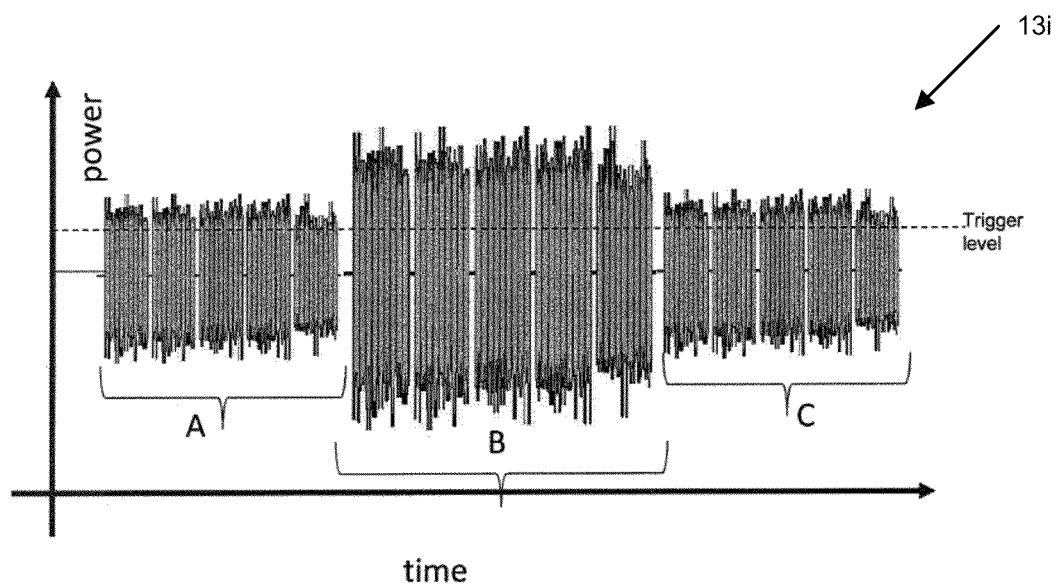
FIG. 2 depicts intended and actual transmit signals from the DUT for the testing environment of FIG. 1.
Figure 2:
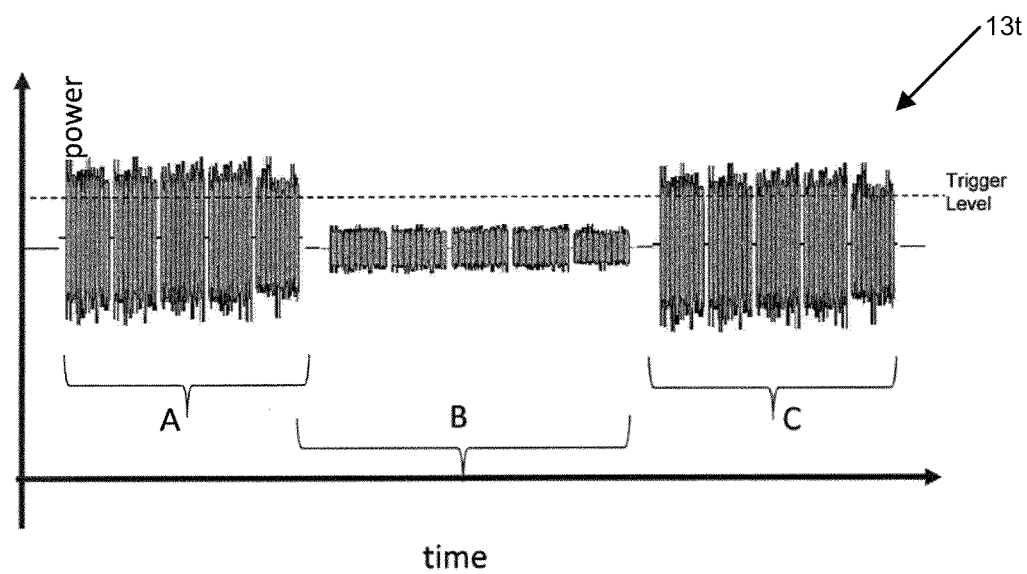

Referring to FIG. 2, this can be better visualized. As depicted in the upper signal wave form diagram, the intended DUT transmit signal 13$i$ was to include a middle sequence having increased signal power. As a result, all three signal sub-sequences A, B, C would have signal power sufficient to exceed the trigger level within the VSA 114 and thereby be assured of being captured all signal sub-sequences A, B, C.

However, as depicted in the lower signal diagram, the actual DUT transmit signal 13$t$ erroneously included a middle sequence B having significantly reduced signal power insufficient to exceed the trigger level, and, therefore, prevented from being captured by the VSA 114 as part of the captured test signal 119$aa$. Accordingly, subsequent analysis of the captured data signal 119$aa$ could erroneously conclude that the second sub-sequence captured corresponds to the intended second sub-sequence B when, in fact, it corresponds to the third sub-sequence C. As a result, the test program would result in an erroneous analysis, and without any other data describing or somehow otherwise related to the actual received signal 13t, detection and/or correction of this erroneous analysis would be difficult and de-bugging of the test program would require significantly more time.

Figure 3:
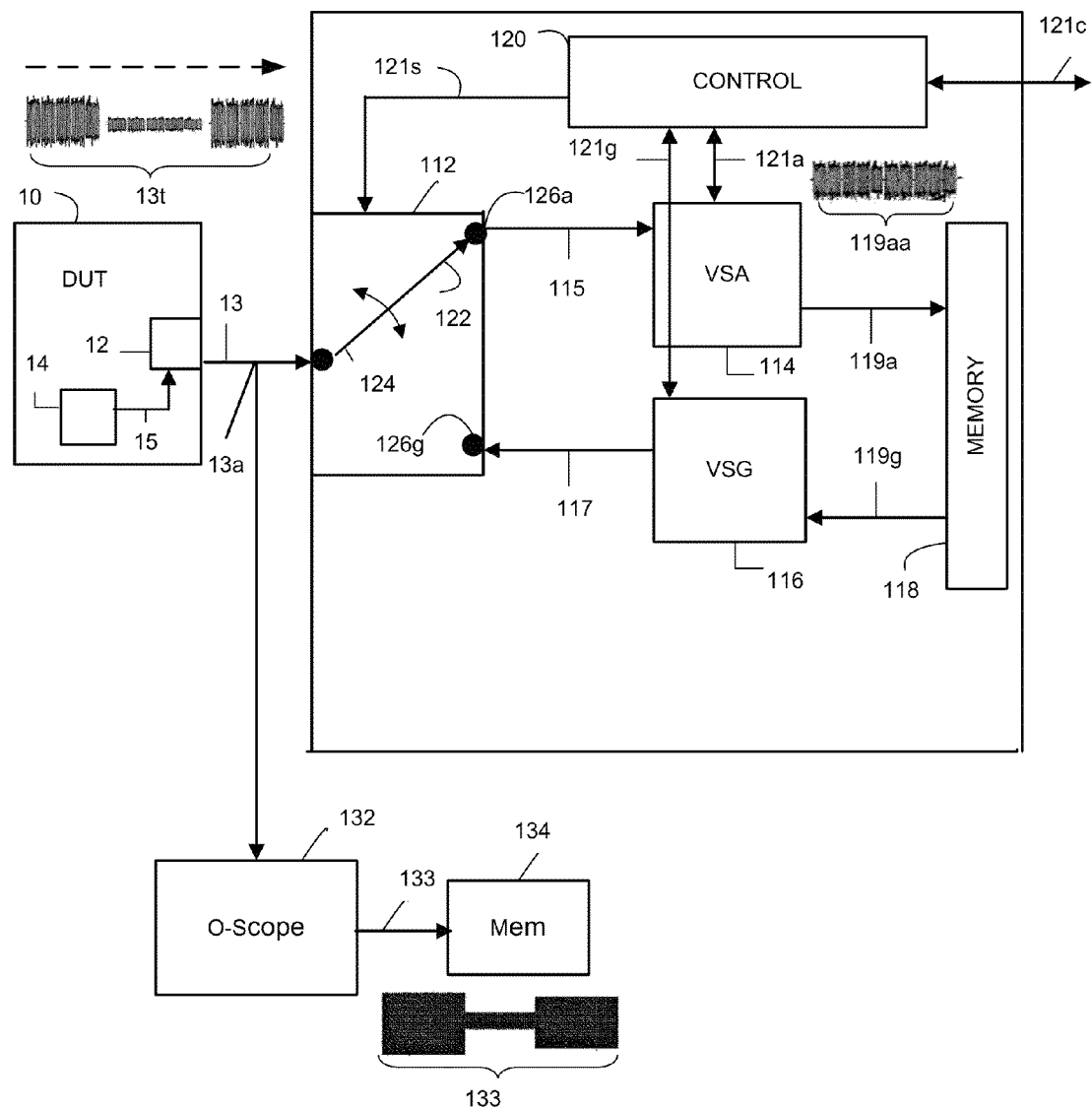
FIG. 3 is a functional block diagram of a conventional testing environment for testing a wireless signal DUT with the addition of external commercial test equipment for capturing the signal directly from the DUT.

Referring to FIG. 3, one approach that has been used in an attempt to capture information about the actual DUT signal 13t includes the use of an external triggered instrument 132, such as a triggering oscilloscope, which can sample and store signal data 133 corresponding to the actual DUT signal 13t. High resolution data is not required, and lower resolution signal data 133 will be adequate and can be stored using less memory 134. This power-versus-time (PVT) data envelope 133 corresponding to the actual DUT signal 13t can be stored and later compared, e.g., in terms of timing of the signal peaks and valleys, among other characteristics, as part of any troubleshooting or debugging of a test program.

Figure 4:
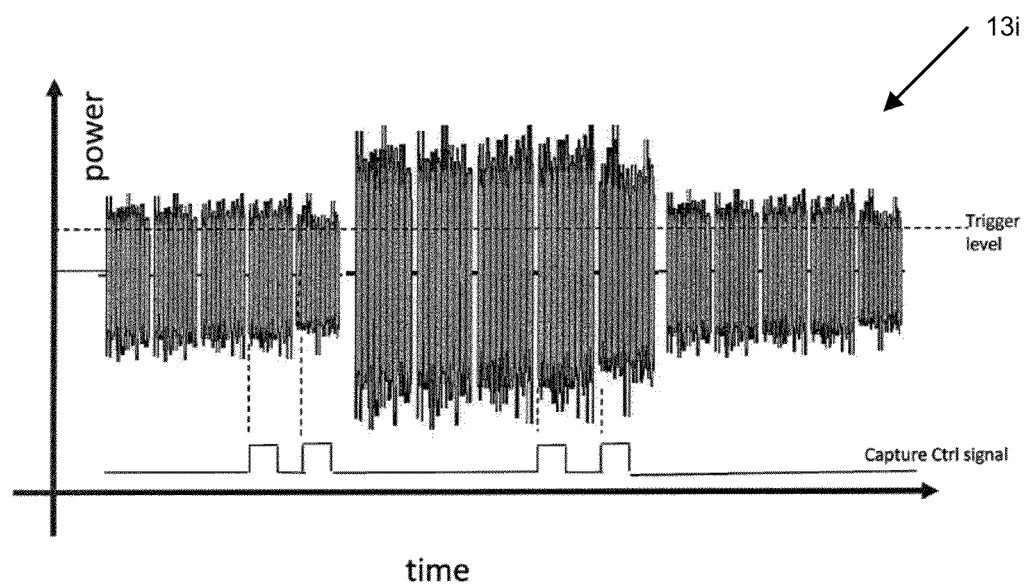
FIG. 4 depicts intended and actual transmit signals from the DUT along with corresponding capture control signals within the tester for the testing environment of FIG. 3.
Figure 4:
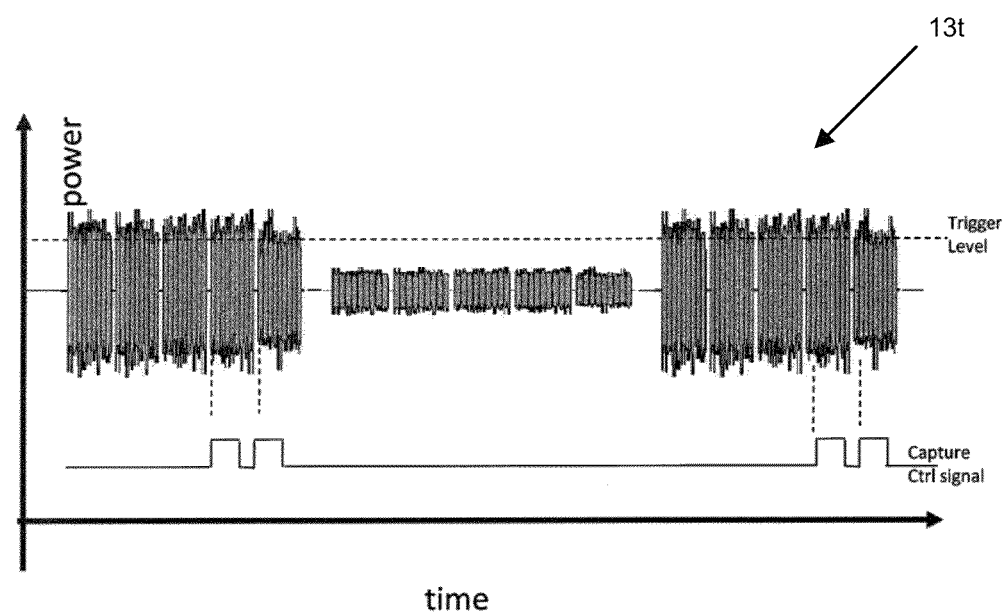

Referring to FIG. 4, as before, the intended DUT signal 13i includes sub-sequences with the middle sub-sequence having increased signal power. However, the actual DUT signal 13t includes sub-sequences in which the middle sub-sequence erroneously has lower signal power. As a result, the signal profiles for the capture control signal associated with the intended DUT signal 13i will differ from that of the capture control signal profile as generated within the VSA 114 for the actual DUT signal 13t. Such difference in capture control signal profiles, e.g., differences in capture control signal pulses versus time, provide insight into possible causes of the program error. However, the capture control signal generated by the VSA 114 is not accessible to the external instrumentation 132. Accordingly, one or more additional external sub-systems would be required to collect, compare and/or correlate the capture control signals produced by the VSA 114 and external instrumentation 132.

Figure 5:
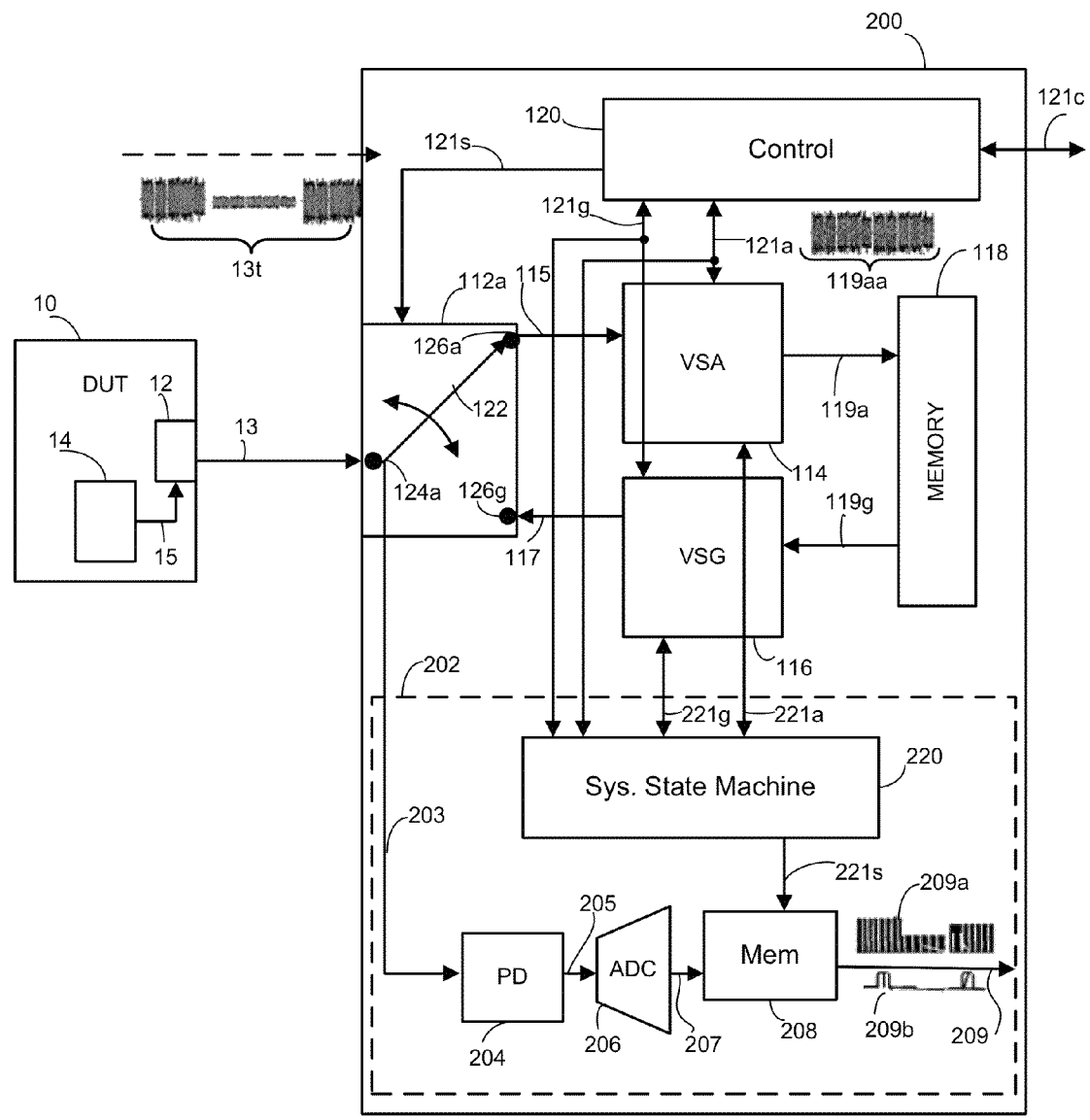
FIG. 5 is a functional block diagram of a wireless signal testing environment using a test system and supporting one or more test methods in accordance with exemplary embodiments of the presently claimed invention.

Referring to FIG. 5, in accordance with exemplary embodiments of the presently claimed invention, the tester 200 further includes a sub-system 202 for capturing signal data related to the actual DUT signal 13t. Also, the signal routing circuitry 112a has the additional ability to provide a signal 203 corresponding to the actual DUT signal 13t. For example, when implemented as a single-pole, double-throw switch, the pole 124a can include a power divider so that the VSA input signal 115 and the diverted input signal 203 both correspond to the actual DUT signal 13t.

This sub-system 202 includes a power detector 204, analog-to-digital conversion (ADC) circuitry 206, digital data storage circuitry 208 (e.g., memory circuitry) and a state machine 220, interconnected substantially as shown. The power detector 204 detects the signal power envelope of the incoming signal 203. The detected power envelope signal 205 is converted to a digital signal 207 by the ADC circuitry 206. This digital data 207 is stored in the memory 208 in accordance with one or more control signals 221s from the state machine 220. The state machine 220 also receives the VSA 121a and VSG 121g control signals and data, as well as control and/or data signals 221a, 221g providing information about the sub-system states of the VSA 114 and VSG 116. Such sub-system control information and data can also be stored in the memory 208 in accordance with the state machine control signals 221s. As a result, one or more state machine data signals 209 can be provided, e.g., depicting the signal power envelope 209a of the incoming DUT signal 203 and the capture control signals 209b.

This advantageously provides for capture and later access to a PVT record of signal sub-sequences A, B, C (FIGS. 2 and 4), plus state machine data (e.g., capture control signal data) associated with the capture of the incoming DUT signal 203. Since the power detector 204 measures the power envelope of the signal, fewer data bits are required and a lower sampling rate can be used, thereby minimizing the amount of capture memory needed. The system state machine 220 will reflect internal timing in controlling the capture and storage in the memory 208. As a result, internal timing, which would not otherwise be accessible by external instruments (FIG. 3), can be used to cross-reference, compare and/or correlate the captured PVT data against internal timing markers. For example, the state machine states 209b during the writing of the data 207 into memory 208 can be stored in the memory 208 along with the PVT envelope data 209a. This provides a more richly populated set of troubleshooting information for use when debugging new or modified test programs.

Figure 6:
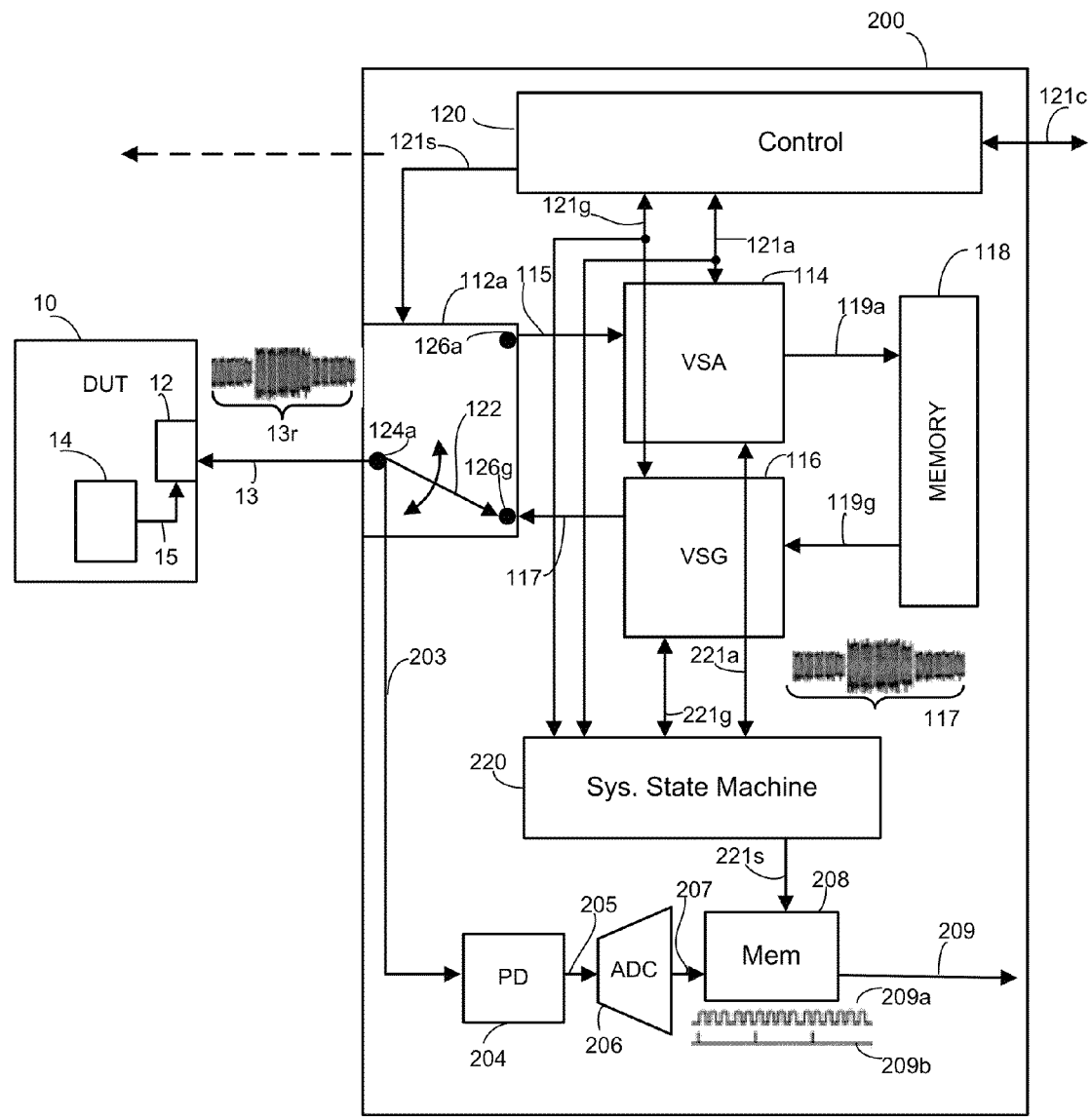
FIG. 6 is functional block diagram of the testing environment of FIG. 5 with the test system supporting one or more test methods in accordance with further exemplary embodiments of the presently claimed invention.

Referring to FIG. 6, in accordance with further exemplary embodiments of the presently claimed invention, such a tester 200 can also be used for troubleshooting and debugging test programs during performance of receive signal tests of the DUT 10, i.e., where the VSG 116 is providing a test signal 117 to be routed out to the DUT 10 via the test signal path 14 as a receive signal 13r for the DUT 10. In this testing scenario, the power detector 204 and ADC circuitry 206 may or may not be needed. However, the state machine 220 can continue to provide state data 209a, 209b for storage in the memory 208. This data 209 can later be accessed when needed for troubleshooting or debugging a test program.

Additionally, in DUT testing scenarios where frequency division duplex (FDD) signals are used, the VSA 114 and VSG 116 can both be active, with the VSA input signal 115 being received and processed by the VSA 114 while the VSG 116 is providing its output signal 117. Test systems and methods in accordance with exemplary embodiments of the presently claimed invention allow for inspection of data packets received by the VSA 114, e.g., to identify an erroneous synchronization event.

Figure 7:
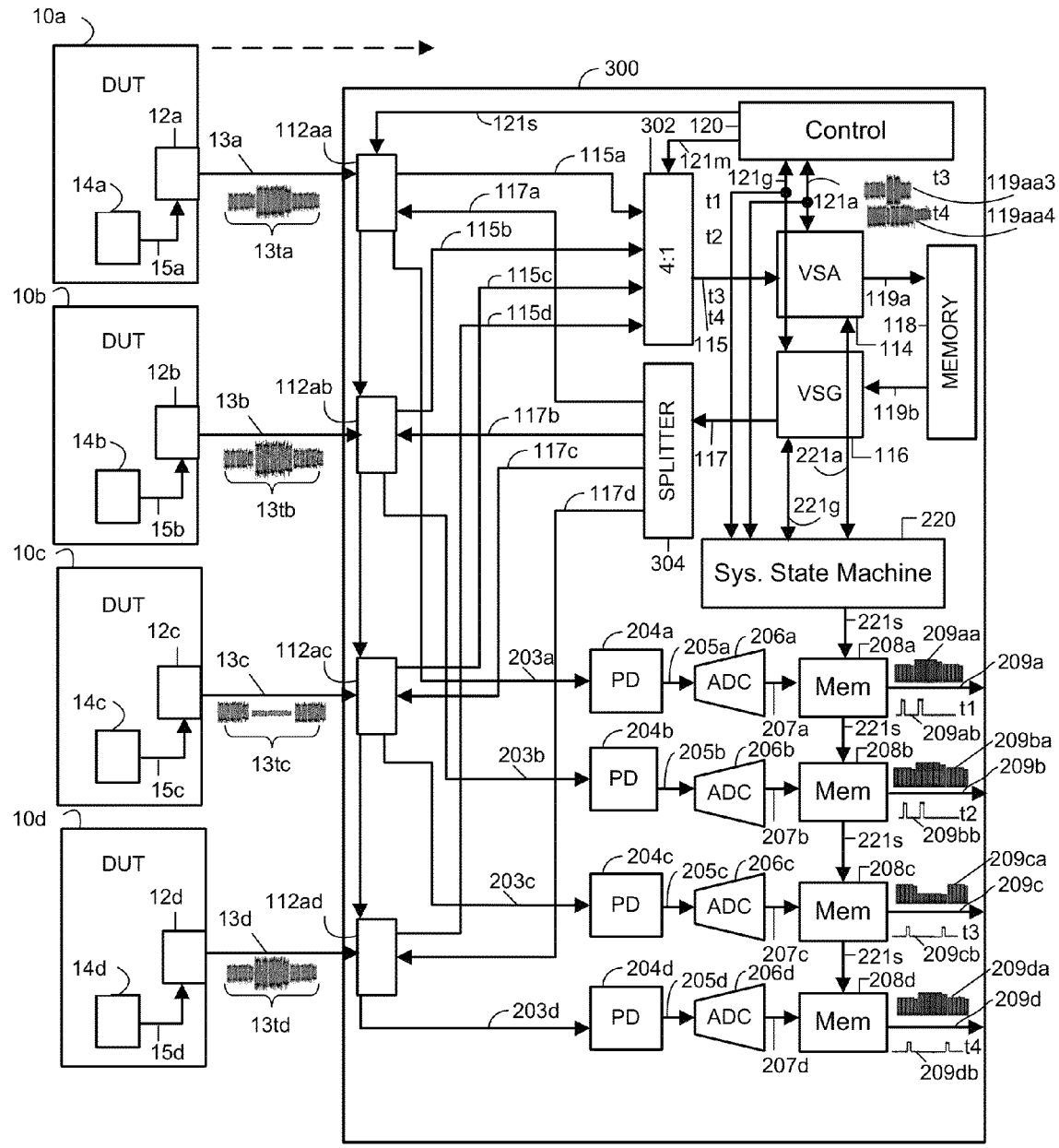
FIG. 7 is a functional block diagram of a testing environment using a test system and supporting one or more test methods in accordance with further exemplary embodiments of the presently claimed invention.

Referring to FIG. 7, in accordance with further exemplary embodiments of the presently claimed invention, the test system 300 can be implemented to support testing of multiple DUTs 10a, 10b, 10c, 10d. (This illustrative example involves a testing environment for four DUTs, but as will be readily appreciated by one of ordinary skill in the art, this implementation can be scaled down or up to support testing of smaller or larger numbers of DUTs). In this exemplary embodiment, the tester 300 includes corresponding numbers of routing circuits 12aa 12ab, 12ac, 12ad, power detectors 204a, 204b, 204c, 204d, ADC circuits 206a, 206b, 206c, 206d and memory elements 208a, 208b, 208c, 208d (as will be readily appreciated, however, a single memory element can also be used to provide sufficient memory for storing the converted data 207a, 297b, 207c, 207d). The tester 300 also includes a multiplexor 302 and a signal splitter 304.

The DUT signals 13ta, 13tb, 13tc, 13td from the DUT transceivers 12a, 12b, 12c, 12d are routed by the signal routing circuits 112aa, 112ab, 112ac, 112ad to the multiplexor 302, which, in accordance with one or more control signals 121m from the controller 120, selects one of its input signals 115a, 115b, 115c, 115d to be provided 115 to the VSA 114, e.g., during successive time intervals t1, t2, t3, t4. As can be seen, the state machine subsystem 202 (FIG. 5) is replicated in accordance with the number of the DUTs 10 to be tested. This allows the PVT envelope data of each diverted DUT signal 203a, 203b, 203c, 203d to be sampled and stored, as discussed above.

In this example, the third DUT 10c is providing an erroneous signal 13tc, which, unlike the remaining DUT signals 13ta, 13tb, 13td, includes a signal sub-sequence with significantly reduced signal magnitude, as opposed to the intended significantly increased signal magnitude (e.g., corresponding to sub-sequence B as depicted in FIGS. 2 and 4). This signal 13*tc* is routed by the multiplexor 302, e.g., during time interval t3, to the VSA 114. This results in the capture and storing of an incomplete signal sequence 119*aa*3, similar to those as described above. Meanwhile, the state machine subsystem associated with the third DUT 10*c* produces PVT data 209*ca* and control signal 209*cb* to be made available as data 209*c* retrievable from the memory 208*c* for analysis in determining problems with the test program.

Alternatively, for DUT receive system testing, the VSG output signal 117 is distributed by the splitter 304 and routing circuits 112*aa*, 112*ab*, 112*ac*, 112*ad* to the DUTs 10*a*, 10*b*, 10*c*, 10*d*. As discussed above, the VSA 121*a* and VSG 121*g* control signals and other VSA and VSG state data 221*a*, 221*g* are captured by the state machine 220 and stored 221*s* in the memory 208*a*, 208*b*, 208*c*, 208*d*, for later use in correlating signal emissions from the VSG 116 with internal system control states.

As will be further appreciated, in accordance with this implementation 300, one DUT signal is monitored by the VSA 114 during any given time interval. However, advantageously, all DUT signals can nonetheless be monitored by having their respective PVT envelopes sampled and stored along with state machine information for later analysis and use in program debugging.

Various other modifications and alterations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a test system for facilitating comparison of radio frequency (RF) data signals transmitted by a device under test (DUT) and received by the test system, comprising:
   signal routing circuitry for routing at least one RF transmit data signal to and at least one RF receive data signal from a DUT;
   data signal source circuitry coupled to said signal routing circuitry and responsive to a portion of a plurality of control signals and a plurality of transmit data by providing said at least one RF transmit data signal and a portion of a plurality of system data;
   data signal analysis circuitry coupled to said signal routing circuitry and responsive to another portion of said plurality of control signals by processing said at least one RF receive data signal and providing a plurality of signal analysis data and another portion of said plurality of system data;
   signal conversion circuitry coupled to said signal routing circuitry and responsive to said at least one RF receive data signal by providing a plurality of receive conversion data related to signal power envelope of said at least one RF receive data signal; and
   a state machine coupled to said data signal source circuitry and said data signal analysis circuitry, and responsive to said plurality of system data and said received conversion data by providing a plurality of state machine data corresponding, at least, to said signal power envelope and a capture control signal from said data signal analysis circuitry, wherein each one of a plurality of portions of said capture control signal is synchronous with a respective portion of said signal power envelope.

2. The apparatus of claim 1, wherein said signal routing circuitry comprises at least one of signal multiplexor circuitry, signal splitting circuitry, switching circuitry and power divider circuitry.

3. The apparatus of claim 1, wherein said data signal source circuitry comprises a vector signal generator (VSG).

4. The apparatus of claim 1, wherein said data signal analysis circuitry comprises a vector signal analyzer (VSA).

5. The apparatus of claim 1, wherein said signal conversion circuitry comprises:
   power detection circuitry responsive to said at least one RF receive data signal by providing a detected power signal; and
   analog-to-digital conversion (ADC) circuitry coupled to said power detection circuitry and responsive to said detected power signal by providing said plurality of receive conversion data.

6. The apparatus of claim 1, wherein said state machine comprises logic circuitry.

7. The apparatus of claim 1, further comprising data storage circuitry coupled to said signal conversion circuitry and said state machine for storing said plurality of receive conversion data and said plurality of state machine data.

8. The apparatus of claim 7, wherein said data storage circuitry comprises local memory circuitry.

9. The apparatus of claim 1, further comprising control circuitry coupled to said data signal source circuitry and said data signal analysis circuitry to provide said plurality of control signals.

10. The apparatus of claim 1, wherein said signal conversion circuitry is further responsive to said at least one RF transmit data signal by providing a related plurality of transmit conversion data.

11. The apparatus of claim 10, further comprising data storage circuitry coupled to said signal conversion circuitry and said state machine for storing said plurality of receive conversion data, said plurality of transmit conversion data and said plurality of state machine data.

12. A method of facilitating comparison of radio frequency (RF) data signals transmitted by a device under test (DUT) and received by a test system, comprising:
   routing at least one RF transmit data signal to and at least one RF receive data signal from a DUT;
   receiving a portion of a plurality of control signals and a plurality of transmit data and in responsive thereto providing said at least one RF transmit data signal and a portion of a plurality of system data;
   receiving another portion of said plurality of control signals and in responsive thereto processing said at least one RF receive data signal and providing a plurality of signal analysis data and another portion of said plurality of system data;
   converting said at least one RF receive data signal to provide a plurality of receive conversion data related to a signal power envelope of said at least one RF received data signal; and
   processing said plurality of system data and said received conversion data with a state machine to provide a plurality of state machine data corresponding, at least, to said signal power envelope and a capture control signal from said data signal analysis circuitry, wherein each one of a plurality of portions of said capture control signal is synchronous with a respective portion of said signal power envelope.

13. The method of claim 12, wherein said routing comprises at least one of signal multiplexing, signal splitting, signal switching and power dividing.

14. The method of claim 12, wherein said converting comprises:
- detecting a power profile of said at least one RF receive data signal to provide a detected power signal; and
- performing an analog-to-digital conversion of said detected power signal to provide said plurality of receive conversion data.

15. The method of claim 12, wherein said processing said plurality of system data with a state machine comprises processing said plurality of system data with logic circuitry.

16. The method of claim 12, further comprising storing said plurality of receive conversion data and said plurality of state machine data.

17. The method of claim 16, wherein said storing comprises storing said plurality of receive conversion data and said plurality of state machine data locally.

18. The method of claim 12, further comprising providing said plurality of control signals.

19. The method of claim 12, further comprising converting said at least one RF transmit data signal to provide a related plurality of transmit conversion data.

20. The method of claim 19, further comprising storing said plurality of receive conversion data, said plurality of transmit conversion data and said plurality of state machine data.

* * * * *